United States Patent Office 3,810,847
Patented May 14, 1974

3,810,847
PROCESS FOR PREPARING FREE-FLOWING
α-OLEFIN SULFONATE POWDERS WHILE
HYDROLYZING SULTONES
Aage Kristiansen, Stenungsund, Sweden, assignor to Mo
Och Domsjo Aktiebolag, Ornskoldsvik, Sweden
No Drawing. Filed Jan. 22, 1971, Ser. No. 108,997
Claims priority, application Sweden, Jan. 23, 1970, 825/70
Int. Cl. C11d 3/065, 1/14, 11/04, 11/02
U.S. Cl. 252—536
12 Claims

ABSTRACT OF THE DISCLOSURE

A process is provided for preparing free-flowing α-olefin sulfonate powders which comprises drying the α-olefin sulfonate under sultone-hydrolyzing conditions in the presence of sufficient alkali to neutralize any free sulfonic acids present as well as free alkene sulfonic acids formed by hydrolysis of sultones present in the α-olefin sulfonate, and recovering a free-flowing α-sulfonate powder substantially free from sultones.

---

The sulfonation of α-olefins with sulfur trioxide produces a mixture of alkene sulfonic acids and sultones. The sultones are derivatives of sulfonated olefins and since they are not water-soluble, they are an undesirable by-product. The alkene sulfonic acids are the desired final product, and these are neutralized to form anion-active α-olefin sulfonate salts, which are useful surfactants for the preparation of synthetic detergent compositions.

In order to remove the sultones, the reaction mixture is subjected to hydrolysis in order to convert the sultones into alkene sulfonic acids and hydroxyalkane sulfonic acids, which can also then be neutralized to form sulfonate salts. Hydrolysis of the sultones takes place under alkaline or acid conditions, but as a rule alkaline conditions are preferred, because the product then has a better color than the product obtained by acid hydrolysis.

The hydrolysis step is quite time-consuming. At a temperature of 100° C., two hours or more are required. It is customary to effect the hydrolysis as a separate step, carried out batchwise in a plurality of reaction vessels, each of which requires two hours or more per batch. Following the hydrolysis, the reaction product must be neutralized. Since the step is slow, taking into account neutralization as well, a large number of vessels is required for this operation.

Alternatively, the hydrolysis can be carried out continuously at a temperature within the range from about 150° to about 160° C., at a pressure of from 8 to 10 kg./cm.² gauge. In this case, the hydrolysis requires only about fifteen minutes. Such a pressure-hydrolysis procedure is described in Dutch patent publication No. 6702437. However, although this hydrolysis is more rapid, it is still necessary to provide special equipment for the hydrolysis, and the hydrolysis conditions must be carefully controlled, in order to obtain a consistent product.

Following the hydrolysis, the α-olefin sulfonates, which are now in the form of a concentrated aqueous slurry or suspension, must be dried so as to obtain a free-flowing powder. Usually, the drying is carried out using hot rolls or spray-drying.

In accordance with the invention, it has been found that if the aqueous sultone-containing α-olefin sulfonate reaction product is dried in the presence of sufficient alkali to neutralize any free alkene sulfonic acids present, as well as the free alkene sulfonic acids and hydroxyalkane sulfonic acids formed by hydrolysis of the sultones, the sultones are substantially completely hydrolyzed in the course of the drying, and a free-flowing α-sulfonate powder is recovered which is substantially free from sultones.

It is quite surprising that under the drying conditions, a substantially complete sultone hydrolysis is obtained, and that it is not necessary to use a separate hydrolysis step.

The sultone-containing α-olefin sulfonate reaction mixture can be dried in any known manner, using, for example, hot rolls or spray-drying. Spray-drying is particularly convenient and is preferred, because it tends to produce more uniform particles.

The drying time selected depends upon the drying method, the drying temperature, and the composition of the slurry or suspension, but it is within the range from about 1 to about 180 seconds. However, longer drying times may be employed, if desired, up to 10 minutes or even longer. Preferably, the drying time is within the range from 9 to 60 seconds.

The drying temperature should be at least 90° C. The higher the drying temperature, the more complete the hydrolysis, and the more rapid, and therefore it is preferred that the drying temperature be in excess of 160° C. However, the drying temperature should not, in general, exceed 300° C., and preferably should not exceed 270° C., in order to avoid discoloration of the final product.

The drying pressure is atmospheric pressure, although a vacuum or a superatmospheric pressure can be used, if desired. Obviously, the lower the pressure, the more rapid the drying, since the more rapidly the water will be removed.

In the course of the drying, the sultones are substantially completely hydrolyzed to alkene sulfonic acids and hydroxyalkane sulfonic acids, and inasmuch as the alkali is present for neutralization, these are also converted to the sulfonate salts of the alkali. The resulting product is therefore composed wholly of olefin sulfonates, including both α-olefin sulfonates and internal olefin sulfonates, and alkane sulfonates, the latter two being derived primarily from the sultones, as well as from internal olefin impurities present in the α-olefin starting material.

The process of the invention is applicable to any α-olefin, but in general the process is applied to α-olefins whose sulfonates have surfactant, wetting, or detergent properties. Such α-olefins have from about ten to about twenty-four carbon atoms, and preferably from about fifteen to about eighteen carbon atoms. The straight chain or linear olefins are preferred, because their sulfonates are more readily biodegradable. Exemplary of such α-olefins are n-decene-1, n-dodecene-1, n-tridencene-1, n-tetradecene-1, n-pentadecene-1, n-hexadecene-1, n-heptadecene-1, n-octadecene-1, n-nonadecene-1, n-eicosene-1, n-heneicosene-1, n-docosene-1, n-tricosene-1, n-tetracosene-1, and mixtures thereof. Such α-olefins are available, but where they are not available they are obtained by ethylene polymerization or in wax cracking, for example. The preferred α-olefins are n-pentadecene-1, n-hexadecene-1, n-heptadecene-1, and n-octadecene-1, and α-olefin mixtures which contain a major proportion of one or more of these α-olefins.

Inn additin to the α-olefins, the invention is applicable to α-olefin sulfonate mixtures which contain up to 50% by weight of internal olefins having from about ten to about twenty-four carbon atoms. Preferably, such internal olefins comprise no more than 25% by weight of internal olefin sulfonates since a high content of internal olefin sulfonates results in a reduced surfactant, wetting, or detergent property. The straight chain or linear olefins are preferred, because their sulfonates are more readily biodegradable.

Sulfonation of such an α-olefin or α-olefin mixture, using, for example, sulfur trioxide, preferably in gaseous diluted form, produces a mixture of alkene sulfonic acids, predominantly α-alkene sulfonic acids, and sultones. Hydrolysis of the sultones produces alkene sulfonic acids and hydroxyalkane sulfonic acids. A very large number of isomers is formed, and the isomer distribution is to a large extent dependent upon the conditions for the sulfonation and the hydrolysis.

The alkali used to hydrolyze the sultones can be any inorganic alkali, such as sodium hydroxide, potassium hydroxide, lithium hydroxide, ammonium hydroxide, sodium carbonate, potassium carbonate or lithium carbonate. It will be seen that some of these materials are conventional builder salts. The amount of alkali is at least that calculated to neutralize the hydrolysis products of the amount of sultones present.

The α-olefin and internal olefin sulfonates which are obtained in accordance with the invention are excellent raw materials in the production of detergent compositions, surfactants, wetting agents, and dispersants. Such olefin sulfonates are customarily combined with the other adjuncts employed in such products, including polyphosphates, builder salts, and soil-suspending agents, bleaching agents and whitening agents, as well as other surfactants.

When the α-olefin sulfonates are used in such compositions, the compositions can be formulated as aqueous slurries and the hydrolysis of the sultones can then take place during the drying of this composition, with the addition of sufficient alkali to neutralize the alkene and hydroxyalkane sulfonic acids formed by hydrolysis of the sultones in the course of the drying.

One class of anionic surfactants are the water-soluble sulfonated and sulfated alkyl phenols. These have at least one —$SO_3$ group, either in the phenol ring or in the alkyl side chain. In the former case, the $SO_3$ group is present as a sulfonate group, attached to a carbon atom of the ring, and in the latter case, the $SO_3$ group is present in the form of a sulfate ester of the corresponding alkylol group, attached thereto through the oxygen atom of the alkylol group. Thus, the alkyl phenols have the structure:

(I)
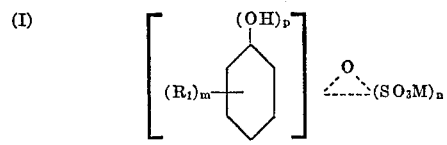

This generic structure includes both of the following two specific structures:

(i)
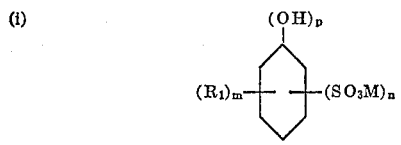

(ii)
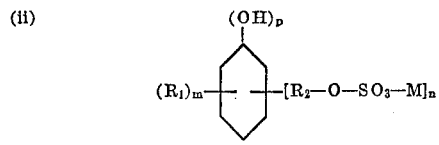

In these structures, $R_1$ is a straight or branched chain alkyl group having from about six to about twelve carbon atoms, $m$ represents the number of alkyl groups on the phenol ring, $SO_3M$ represents the sulfonate group, $R_2$—O—$SO_3$—M represents the sulfated alkyl group, $n$ the number of such groups, $p$ the number of hydroxyl groups, and $R_2$ is a straight or branched chain alkylene group having from six to twelve carbon atoms.

The total of $m$, $n$ and $p$ in each structure is six, and each is an integer ranging from 1 to 4.

M is a monovalent cation such as hydrogen, an inorganic cation such as sodium, potassium or ammonium or an organic cation such as a highly basic amine, for example, triethanolamine, diethanolamine, monoethanolamine or tributylamine.

The alkyl sulfonates are defined by the structure

R—$SO_3$—M where R represents a long chain saturated or unsaturated aliphatic group having from eight to eighteen carbon atoms, such as the mixed sodium alkane sulfonates derived from petroleum, sodium decane sulfonate, sodium dodecane sulfonate and sodium octadecane sulfonate.

The alkyl sulfates are the sulfated long chain alkyl alcohols having the formula R—O—$SO_3$—M such as sodium lauryl sulfate, sodium palmityl sulfate, sodium octadecyl sulfate, sodium decyl sulfate and sodium octyl sulfate.

The aryl sulfonates and alkyl aryl sulfonates contain an aromatic ring having sulfonate groups attached to one or more of the ring carbon atoms. The alkyl aryl sulfonates have in addition an alkyl group having from one to sixteen carbon atoms. Both are defined by the chemical structure:

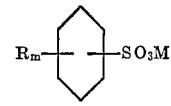

where R can be hydrogen or an alkyl group having from one to sixteen carbon atoms and $m$ is the number of such groups and has a value from one to about four. Typical are sodium benzene sulfonate, sodium toluene sulfonate, sodium xylene sulfonate, sodium dodecyl benzene, sulfonate, and sodium lauryl benzene sulfonate. One group of these compounds, the sodium polypropylene benzene sulfonates, is described in U.S. Pat. No. 2,477,383 to Lewis. Also useful are the sodium keryl benzene sulfonates.

The amidoalkane sulfonates are characterized by the structure of an amide, of which the nitrogen is attached through an alkylene group to the sulfonate radical, and have the structure:

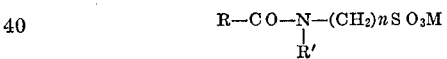

$n$ is a small whole number from 1 to about 5, preferably 2 or 3, R' is hydrogen or an alkyl, aryl, or cycloaliphatic group, such as methyl, and R is an alkyl or alkylene radical, such as myristyl, palmityl, oleyl and stearyl. Sodium palmitic tauride, sodium palmitic methyl tauride, sodium myristic methyl tauride, sodium palmitic-stearic methyl tauride and sodium palmitic methyl amidopropane sulfonate are typical examples thereof.

The sulfonated acids and esters of organic acids also are useful, particularly the sulfuric acid esters of aliphatic acids of ten to eighteen carbon atoms, particularly oleic acid, tall oil acids, turkey red oil acids, and acids derived by the reduction of the fatty acids derived from nium-1-ethyoxy-ethionic acid-2-ethionic acid, long-chain fatty acids, sulfonated castor oil, esters and ethers of isethionic acid (beta hydroxyethylene sulfuric acid) and the esters and ethers of the acid sulfate of isethionic acid, i.e., ethionic acid, such as for example lauroylcycloimidinium-1-ethyoxy-ethionic acid-2-ethionic acid, long-chain fatty acid esters and long-chain alkyl ethers of 2,3-dihydroxypropane sulfonic acid, and sulfuric acid esters of monoglycerides and glycerol monoethers.

The sulfated polyoxyalkylene glycol ethers have the structure, R—A—(YO)$_x$—Y—O—$SO_3$M. These compounds are in every respect the same as the polyoxyalkylene glycol ethers of the invention, with the addition of the sulfate group O—$SO_3$—M.

In all of the above formulae, it will be understood that M represents hydrogen, or a monovalent inorganic cation such as sodium, potassium or ammonium, or a monovalent organic cation such as a highly basic amine, for example triethanolamine, diethanolamine, monoethanolamine or tributylamine.

The polyoxyalkylene glycol ethers are a class of nonionic surfactants and are defined by the following general formula:

(II)    R—A—[Y—O]$_x$—Y—OH wherein R is a straight or branched chain saturated or unsaturated hydrocarbon group having from about eight to about twenty-four carbon atoms, or an aralkyl group having a straight or branched chain saturated or unsaturated hydrocarbon group of from about eight to about twelve carbon atoms attached to the aryl nucleus, the aralkyl group being attached to A through the aryl nucleus. A is selected from the group consisting of ethereal oxygen and sulfur, amino, carboxylic ester and thio carboxylic ester groups. Y represents a straight or branched chain alkylene group having from two to four carbon atoms and $x$ is a number from about 8 to about 20.

R can for example be a straight or branched chain alkyl group, such as octyl, nonyl, decyl, lauryl, myristyl, cetyl or stearyl; an alkylene group, such as hexenyl, dodecenyl, oleyl, linolenyl; or an alkyl aryl group, such as octyl phenyl, nonyl phenyl, decyl phenyl, dodecyl phenyl, or isooctyl phenyl. Y can be ethylene, 1-methylethylene, 1,2-diethylethylene, 1,1-diethylmethylene, 1,3-propylene and 1-butylene.

When R is alkyl, it will be evident that the polyoxyalkylene glycol ether can be regarded as derived from an alcohol, mercaptan, amine, or an oxy or fatty acid of high molecular weight, by condensation with an alkylene oxide, for example, ethylene oxide, 1,2-propylene oxide, 2,3-butylene oxide, or 1,2-butylene oxide. Typical of this type of product are the condensation products of oleyl, stearyl, lauryl, palmityl, and myristic alcohol, mercaptan or amine or oleic, lauric, palmitic, myristic or stearic acid, with from 8 to 17 moles of ethylene oxide such as Emulfor-ON, Nomic 218, Sterox SE and Sterox SK. Typical alkyl esters are Renex (polyoxyethylene ester of tall oil acids) and Neutronyx 330, and 331, higher fatty acid of polyethylene glycol.

When R is aralkyl the polyoxyalkylene glycol ether can be derived from an alkyl phenol or thiophenol.

The polyoxyalkylene alkyl phenols have the following general formula:

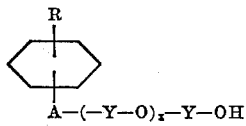

A—(—Y—O)$_x$—Y—OH where R is a straight or branched chain saturated or unsaturated hydrocarbon group having from about eight to about eighteen carbon atoms, A is oxygen or sulfur, and $x$ is a number from 8 to 20. R can, for example, be a straight or branched chain octyl, nonyl, decyl, lauryl, cetyl, myristyl or stearyl group. Typical are the condensation products of octyl and nonyl phenol and thiphenol with from 8 to 17 moles of ethylene oxide, available commercially under the trade names "Igepal CA" and "CO," NIW, Antarox A 400, Triton X–100, Neutronyx 600 and Tergitol NFX.

The surfactant compositions usually contain polyphosphates as the principal inorganic builder. Other builders which can be used with or without the polyphosphates, includes alkali metal and alkaline earth metal sulfates, chlorides, silicates, hydroxides, borates, carbonates, metaphosphates and orthophosphates, such as sodium silicate, magnesium sulfate, sodium carbonate, sodium sulfate, sodium hydroxide, potassium hydroxide, trisodium orthophosphate, potassium carbonate, sodium dihydrogen orthophosphate, sodium metaphosphate, calcium orthophosphate, calcium sulfate, calcium chloride, sodium chloride, sodium borate, potassium metaphosphate, and magnesium chloride. The builders should be water-soluble.

As the polyphosphate, any of the alkali metal polyphosphates as a class can be employed, such as the tripolyphosphates including pentasodium tripolyphosphate, and pentapotassium tripolyphosphate, the pyrophosphates such as tetrasodium pyrophosphate and tetrapotassium pyrophosphate, the hexametaphosphates, such as sodium hexametaphosphate and potassium hexametaphosphate, and the tetrapolyphosphates such as hexasodium tetrapolyphosphate and hexapotassium tetrapolyphosphate.

In addition to, or instead of the above-mentioned builder materials, organic materials such as starch, polyethylene glycols, polyvinyl alcohol and salts of carboxymethyl cellulose may be used as builders. Between about 0.1 and 1% of an alkali metal carboxymethyl cellulose increases detergency and sudsing.

For use in hard water, or in water of high salt content that might produce stains, such as iron salts, the inorganic builder can include a chelating agent or sequestrant such as a salt of an aminoacetic acid compound. Only small amounts are needed. Amounts within the range from about 0.015 to about 5% by weight of the total aqueous concentrate are usually sufficient, but more can of course be used, if salt contents so require.

The aminoacetic acid compounds that can be used with the inorganic builders herein are defined by the following formula:

$$R_2OOC-\underset{\underset{R_1}{|}}{CH}-N-\underset{}{CH}-COOR_3$$
$$\phantom{R_2OOC-CH-}\overset{R_4}{|}\phantom{N-}\overset{R_5}{|}$$

wherein $R_1$ is selected from the group consisting of

CHR$_6$CHR$_7$OH,

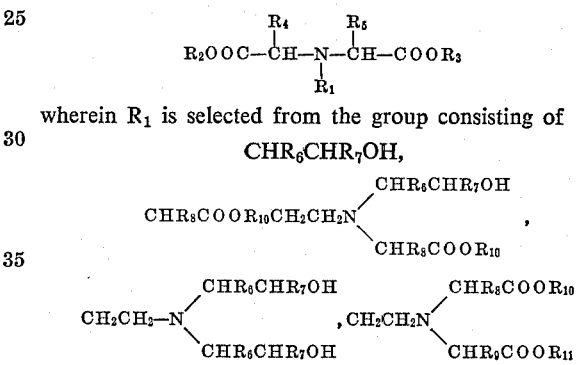

and a polymeric chain of $n$ units of:

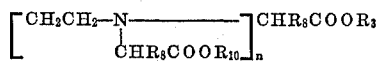

where $n$ is an integer from 1 to 7, and a polymeric chain of $n$ units of

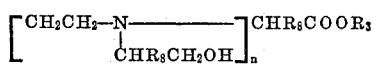

where $n$ is an integer from 1 to 7; and wherein $R_4$, $R_5$, $R_6$, $R_7$, $R_8$ and $R_9$ are selected from the group consisting of hydrogen, alkyl groups of from one to three carbon atoms; and at least one of $R_2$, $R_3$, $R_{10}$ and $R_{11}$ are selected from the group consisting of hydrogen, ammonium and alkali metals, such as sodium, potassium and lithium, and the remainder of $R_2$, $R_3$, $R_{10}$ and $R_{11}$ are selected from the group consisting of hydrogen, ammonium and alkali metals, such as sodium, potassium and lithium, aliphatic, cycloaliphatic, aromatic and heretocyclic groups, having from one to about eighteen carbon atoms. $R_4$, $R_5$, $R_6$, $R_7$, $R_8$ and $R_9$ can, for example, be methyl, ethyl, propyl, isopropyl, CH$_2$OH, CH$_2$CH$_2$OH, CH$_2$CH$_2$CH$_2$OH and

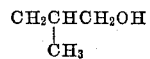

$R_2$, $R_3$, $R_{10}$ and $R_{11}$ can be for example, straight and branched chain alkyl groups such as methyl, ethyl, propyl, butyl, hexyl, lauryl, decyl, nonyl, octadecyl, isopropyl, isobutyl, tertiary butyl; cycloalkyl groups such as cyclopropyl, cyclohexyl, cyclopentyl and hexahydrotolyl; aryl groups such as phenyl and naphthyl; aralkyl and alkaryl groups such as tolyl, xylyl and benzyl. These may include inert substituents such as hydroxy, amido, mercapto, thio and halogen groups, among others.

$R_4$ and $R_5$ may be taken together or with $R_1$ to form an N-heterocyclic ring, as with an alkylene group, for example, ethylene and propylene, or an arylene group, such as phenylene or

Exemplary of the aminocetic acid compounds which can be used are ethylene diamine tetraacetic acid, the mono-, di-, tri- and tetra-sodium, potassium, lithium and ammonium salts of ethylene diamine tetraacetic acid; the trisodium, potassium, lithium, or ammonium salts of monomethyl, monoethyl, monopropyl, monoisopropyl, monobutyl, monopentyl, monohexyl, monobenzyl, monoamyl, monoallyl, monoethylene and monophenylene esters of ethylene diamine tetraacetic acid; as wall as nitrilotriacetic (triglycollamic), hydroxyethylethylene diamine triacetic, hydroxyethyliminodiacetic, diethylene triamine pentaacetic, and tetraethylenepentamineheptaacetic acids, the mono-, di- or tri-sodium, potassium, lithium, and ammonium salts of such acids and the disodium, potassium, lithium or ammonium salts of the ethyl, ethyl, propyl, isopropyl, butyl, pentyl, hexyl, benzyl amyl, and allyl monoesters of such acids.

The detergent-inorganic builder composition of the invention contains from about 2% to about 80% and preferably from about 10% to about 30% by weight total detergent and from about 20% to about 98% and preferably from about 70% to about 90% inorganic builder.

Such compositions are prepared by conventional methods, as by blending the ingredients thereof in an aqueous concentrate or slurry.

The total amount of $\alpha$-olefin sulfonate present in the final composition is usually within the range from about 2% to about 50% by weight, while the remaining surfactants and adjuncts are within the range from about 50 to about 98% by weight.

The process of the invention is illustrated by the following examples, in which the products obtained have been analyzed for anionic activity by two-phase titration according to Epton (V. Reid, G. Long Man, E. Meinerth, "Determination of Anionic-Active Detergents By Two-Phase Titration," Tenside 4, 1967, p. 292).

EXAMPLE 1

An $\alpha$-olefin mixture was sulfonated using gaseous diluted sulfur trioxide in accordance with the process and using the apparatus disclosed in U.S. Pat. No. 3,438,742 to Grunewald et al., dated April 15, 1969. The $\alpha$-olefin starting material had the composition:

| | Percent by weight |
|---|---|
| $\alpha$-Olefins | 89 |
| Internal-olefins | 7 |
| Diolefins and saturated hydrocarbons | 4 |
| $C_{14}$ olefins | 1 |
| $C_{15}$ olefins | 27 |
| $C_{16}$ olefins | 29 |
| $C_{17}$ olefins | 28 |
| $C_{18}$ olefins | 14 |
| $C_{19}$ olefins | 1 |

The sulfonic acids obtained were neutralized by adding a 12% aqueous sodium hydroxide solution. To the aqueous slurry obtained was added a quantity of 12% sodium hydroxide solution corresponding to the amount of sulfonic acids to be formed from the amount of sultones present, determined by analysis. The mixture was then hydrolyzed in an acid-resistant autoclave provided with an agitator for two hours at 100° C. The hydrolyzed suspension obtained had a brownish color, and the following analysis:

| | |
|---|---|
| Anionic activity according to Epton, percent | 38.2 |
| Nonsulfonoated, percent by weight of the suspension | 1.1 |
| Salt content, percent by weight of the suspension | 1.0 |
| pH, 1% anion-active solution | 9.6 |

The product was regarded as a control. A second sample was then taken from the neutralized alkali-containing sultone-containing olefin sulfonate reaction product, and this sample was dried by the process of the invention on a drying roll having a 179° C. surface temperature. The drying time required was 30 seconds. The product formed was a brownish powder having the following analysis:

| | |
|---|---|
| Anionic activity according to Epton, percent | 93.4 |
| Nonsulfonated, percent by weight of the product | 2.7 |
| Salt content, percent by weight of the product | 3.4 |
| $H_2O$, percent by weight of the product | 0.4 |
| pH, 1% anion-active solution | 7.8 |

This analysis shows that complete hydrolysis of the sultones present was obtained during the drying, even though the hydrolysis and the drying required a time of only 30 seconds. The product could be used directly as a surfactant in detergent compositions.

EXAMPLE 2

An $\alpha$-olefin mixture was sulfonated using the apparatus and process of U.S. Pat. No. 3,438,742, dated April 15, 1969. This mixture had the following composition:

| | Percent by weight |
|---|---|
| $\alpha$-Olefins | 92 |
| Internal-olefins | 3 |
| Diolefins and saturated hydrocarbons | 5 |
| $C_{10}$ olefins | 2 |
| $C_{11}$ olefins | 23 |
| $C_{12}$ olefins | 23 |
| $C_{13}$ olefins | 24 |
| $C_{14}$ olefins | 25 |
| $C_{15}$ olefins | 3 |

To the olefin sulfonic acid mixture thus obtained there was added a 12% aqueous sodium hydroxide solution in an amount equivalent to the amount of olefin sulfonic acids present plus the olefin sulfonic acids to be formed by the hydrolysis of the sultones present, the amount of which were determined by analysis. The alkaline mixture was then dried in accordance with the process of the invention, using a drying roll having a surface temperature of 176° C.; the drying time required was 30 seconds. The product obtained was a brownish free-flowing powder having the following analysis:

| | |
|---|---|
| Anionic activity according to Epton, percent | 94.0 |
| Nonsulfonated percent by weight of the product | 2.0 |
| Salt content, percent by weight of the product | 3.5 |
| $H_2O$, percent by weight of the product | 0.5 |
| pH, 1% anion-active solution | 9.1 |

The results show that substantially complete hydrolysis of the sultones was obtained. The product was found to have a high degree of anionic activity by the test procedure described.

EXAMPLE 3

Using the apparatus and process of U.S. Pat. No. 3,438,742, dated April 15, 1969, the following $\alpha$-olefin mixture was sulfonated:

| | Percent by weight |
|---|---|
| $\alpha$-Olefins | 88 |
| Internal olefins | 6 |
| Diolefins and saturated hydrocarbons | 6 |
| $C_{14}$ olefins | 1 |
| $C_{15}$ olefins | 18 |
| $C_{16}$ olefins | 17 |
| $C_{17}$ olefins | 16 |
| $C_{18}$ olefins | 16 |
| $C_{19}$ olefins | 14 |
| $C_{20}$ olefins | 13 |
| $C_{21}$ olefins | 5 |

To the olefin sulfonic acid mixture thus obtained there was added a 12% aqueous sodium hydroxide solution in an amount equivalent to the amount of olefin sulfonic acid present and the amount of olefin sulfonic acid to be formed by hydrolysis of the sultones present, determined by analysis. The alkaline reaction mixture was then dried in accordance with the invention on a drying roll having a surface temperature of 176° C., for 35 seconds. The product obtained was a free-flowing brownish powder having the following analysis:

| | |
|---|---|
| Anionic activity according to Epton, percent | 93.3 |
| Nonsulfonated, percent by weight of the product | 2.8 |
| Salt content, percent by weight of the product | 3.4 |
| $H_2O$, percent by weight of the product | 0.5 |
| pH, 1% anion-active solution | 9.0 |

The results obtained show that complete hydrolysis of the sultones present was obtained. The product had a high degree of anionic activity.

EXAMPLE 4

The α-olefin mixture in accordance with Example 1 was sulfonated in accordance with the process and apparatus of U.S. Pat. No. 3,438,742 dated April 15, 1969. The proudct was then combined with an amount of 12% aqueous sodium hydroxide corresponding to the amount of olefin sulfonic acid present and the amount of olefin sulfonic acid calculated to be formed by hydrolysis of the sultones present, determined by analysis. The resulting aqueous alkaline slurry was then spray-dried using a centrifugal sprayer. The slurry had a 40% dry solids content, and was pumped to the sprayer by means of a screw pump, the capacity of which could be adjusted continuously. The spray-drying was carried out at a rate of 30 kg. of slurry per hour. The sprayer rotated at 24,000 r.p.m. The tower was gas-heated and about 23000 kg. of air per hour was used. The input temperature of the air was 220° C., while the output temperature was 100° C. The average drying time per particle was 3 seconds. The powder obtained was conveyed pneumatically to a bagging machine, and was free-flowing. The following analysis data were obtained:

| | |
|---|---|
| Appearance: Yellow-brown powder. | |
| Anionic activity according to Epton ____percent__ | 93.0 |
| Nonsulfonated material _____do__ | 2.6 |
| Salt content _____do__ | 3.6 |
| Water content _____do__ | 0.8 |
| pH, 1% anion-active solution | 9.5 |

The analysis shows that complete hydrolysis of the sultones present took place during the spray-drying, in spite of the very short drying time. The product was suitable for use as a surfactant in detergent compositions.

EXAMPLE 5

The α-olefin of Example 1 was sulfonated using the apparatus and process of U.S. Pat. No. 3,438,742 dated April 15, 1969. To the resulting reaction product was added an amount of 12% aqueous sodium hydroxide solution equivalent to the amount of olefin sulfonic acids present, plus the amount of olefin sulfonic acids expected to be formed by hydrolysis of the sultones present, determined by analysis. The resulting alkaline aqueous slurry had a 40% dry solids content. This slurry was then spray-dried, using the apparatus of Example 4. The spray-drying time was about 3 seconds. The input temperature of the air was held at 300° C. while the exit air temperature was 100° C. The product was a free-flowing powder having the following analysis:

| | |
|---|---|
| Appearance: Yellow-brown powder. | |
| Anionic activity according to Epton ____percent__ | 93.7 |
| Nonsulfonated material _____do__ | 1.8 |
| Salt content _____do__ | 4.0 |
| Water content _____do__ | 0.5 |
| pH, 1% anion-active solution | 9.1 |

The analysis shows that complete hydrolysis of sultones took place during the spray-drying. The product obtained was suitable for use as a surfactant in detergent compositions.

EXAMPLE 6

A detergent composition was pepared by mixing the following solid materials dry:

| | Percent by weight |
|---|---|
| Dinonyl phenol condensed with 16 moles of ethylene oxide | 2.4 |
| Sodium tallow fatty acid soap | 2.4 |
| Pentasodium tripolyphosphate | 21.0 |
| Sodium silicate | 4.2 |
| Sodium carboxymethylcellulose | 0.6 |
| Sodium sulfate | 18.0 |
| Optical whitening agent | 0.2 |
| Sodium hydroxide | 0.7 |
| Water | 44.9 |
| Neutralized α-olefin sulfonic acid produced from the α-olefin product according to Example 1 | 5.6 |

This slurry was homogenized at 70° C. and was pumped to a spray tower provided with a centrifugal sprayer, and spray dried as described in Example 4. The entering air stream at the tower had a temperature of 250° C. and the exit air stream a temperature of 95° C. The average drying time per particle was about 4 seconds. A free-flowing powder of good detergent activity was obtained. Analysis showed that the sultones had been hydrolyzed in the course of the spray drying, and the product was substantially free of sultones.

Having regard to the foregoing disclosure, the following is claimed as the inventive and patentable embodiments thereof:

1. A method for preparing free-flowing α-olefin sulfonate powders from aqueous α-olefin sulfonate slurries containing substantially the quantities of unhydrolyzed sultones formed as a by-product of sulfur trioxide sulfonation of the α-olefin, which comprises drying and simultaneously hydrolyzing the unhydrolyzed sultones by drying an aqueous slurry of sultone-containing α-olefin sulfonate having from about ten to about twenty-four carbon atoms under sulfone-hydrolyzing conditions at a temperature within the range from about 90° to about 300° C. over a drying time within the range from about one second to about ten minutes in the presence of sufficient free alkali selected from the group consisting of alkali metal hydroxides and alkali metal carbonates to neutralize any free alkene sulfonic acids present as well as free alkene sulfonic acids and hydroxyalkane sulfonic acids formed by hydrolysis of sultones present in the α-olefin sulfonate, and recovering a free-flowing α-olefin sulfonate powder substantially free from sultones without having applied a separate sultone-hydrolysis step.

2. A process in accordance with claim 1 in which the drying temperature is within the range from about 160 to about 270° C.

3. A process in accordance with claim 1 in which the α-olefin sulfonate is in admixture with internal olefin sulfonate in an amount up to about 50% by weight.

4. A process in accordance with claim 1 in which the α-olefin sulfonate is composed of straight-chain α-olefins.

5. A process in accordance with claim 4 in which the α-olefin sulfonate is in admixture with internal olefin sulfonate in an amount up to about 50% by weight.

6. A process in accordance with claim 1 in which the slurry also includes at least one water-soluble inorganic alkaline builder salt.

7. A process in accordance with claim 6 in which the amount of α-olefin sulfonate is within the range from about 2 to about 50% by weight of the composition, and the remaining components are within the range from about 50 to about 98% by weight of the composition.

8. A process in accordance with claim 1 in which the drying is carried out by roll drying.

9. A process in accordance with claim 1 in which the drying is carried out by spray drying.

10. A process in accordance with claim 1 in which the slurry also includes at least one water-soluble alkali metal polyphosphate.

11. A process in accordance with claim 1 in which the slurry also includes at least one surfactant component selected from the group consisting of water-soluble anionic and nonionic synthetic detergents.

12. A process in accordance with claim 1 in which the slurry also includes a water-soluble ammonium or alkali metal salt of an aminoacetic acid compound.

References Cited
UNITED STATES PATENTS

| | | | |
|---|---|---|---|
| 3,506,580 | 4/1970 | Rubinfeld et al. | 252—138 |
| 3,409,637 | 11/1968 | Eccles et al. | 260—327 |
| 3,492,239 | 1/1970 | Baumann et al. | 252—555 X |
| 3,488,384 | 1/1970 | Kessler et al. | 260—513 |
| 3,428,654 | 2/1969 | Rubinfeld et al. | 260—327 |
| 3,376,336 | 4/1968 | Stein et al. | 260—513 |
| 3,420,875 | 1/1969 | DiSalvo et al. | 260—513 |
| 3,496,225 | 2/1970 | Logan et al. | 260—513 |

LEON D. ROSDOL, Primary Examiner

P. E. WILLIS, Assistant Examiner

U.S. Cl. X.R.

252—555; 260—513 R

UNITED STATES PATENT OFFICE
CERTIFICATE OF CORRECTION

Patent No. 3,810,847  Dated May 14, 1974

Inventor(s) Aage Kristiansen

It is certified that error appears in the above-identified patent and that said Letters Patent are hereby corrected as shown below:

| | |
|---|---|
| Column 2, line 4 | : "Thhe" should be --The-- |
| Column 2, line 46 | : "n-tridencene-1" should be --n-tridecene-1-- |
| Column 2, line 57 | : "Inn" should be --In-- |
| Column 2, line 57 | : "additin" should be --addition-- |
| Column 4, line 29 | : please delete comma (,) after "benzene" |
| Column 4, line 56 | : please delete "nium-1-ethyoxy-ethionic acid-2-ethionic acid" and insert --coconut oil, palm oil, sperm oil and the like-- |
| Column 5, line 64 | : change period (.) to a comma (,) after "sulfates" |
| Column 6, line 57 | : "heretocyclic" should be --heterocyclic-- |
| Column 7, line 5 | : "aminocetic" should be --aminoacetic-- |
| Column 7, line 20 | : "ethyl", first occurrence, should be --methyl-- |
| Column 7, line 21 | : please insert a comma (,) after "benzyl" |
| Column 7, line 72 | : "Nonsulfonoated" should be --Nonsulfonated-- |

UNITED STATES PATENT OFFICE
CERTIFICATE OF CORRECTION

Patent No. 3,810,847      Dated May 14, 1974

Inventor(s) Aage Kristiansen

It is certified that error appears in the above-identified patent and that said Letters Patent are hereby corrected as shown below:

Column 9, line 24    :    "proudct" should be --product--

Column 9, line 35    :    "23000" should be --2300--

Column 10, line 8    :    "pepared" should be -- prepared--

Column 10, line 50    :    "sulfone" should be --sultone--

Signed and Sealed this third Day of February 1976

[SEAL]

Attest:

RUTH C. MASON
*Attesting Officer*

C. MARSHALL DANN
*Commissioner of Patents and Trademarks*